United States Patent
Sten et al.

(10) Patent No.: US 9,958,049 B1
(45) Date of Patent: May 1, 2018

(54) ELECTRIC DRIVE MODULE WITH RAVIGNEAUX GEARSET

(71) Applicant: e-AAM Driveline Systems AB, Trollhättan (SE)

(72) Inventors: Erik J. Sten, Trollhättan (SE); Gabriel Trönnberg, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days. days.

(21) Appl. No.: 15/594,915

(22) Filed: May 15, 2017

(51) Int. Cl.
*F16H 48/295* (2012.01)
*F16H 48/36* (2012.01)
*F16H 48/10* (2012.01)
*F16H 48/08* (2006.01)
*F16H 48/22* (2006.01)
*F16H 48/30* (2012.01)
*F16H 48/34* (2012.01)

(52) U.S. Cl.
CPC ........... *F16H 48/295* (2013.01); *F16H 48/08* (2013.01); *F16H 48/10* (2013.01); *F16H 48/22* (2013.01); *F16H 48/30* (2013.01); *F16H 48/34* (2013.01); *F16H 48/36* (2013.01)

(58) Field of Classification Search
CPC ........ F16H 48/295; F16H 48/22; F16H 48/08; F16H 48/34; F16H 48/10; F16H 48/30; F16H 48/36
See application file for complete search history.

(56) References Cited

U.S. PATENT DOCUMENTS

| | | |
|---|---|---|
| 4,831,890 A | 5/1989 | Valentin et al. |
| 4,862,770 A | 9/1989 | Smith |
| 4,962,969 A | 10/1990 | Davis |
| 5,242,336 A | 9/1993 | Hori |
| 5,415,598 A | 5/1995 | Sawase et al. |
| 5,518,463 A | 5/1996 | Shibahata et al. |
| 5,518,464 A | 5/1996 | Teraoka |
| 5,588,328 A | 12/1996 | Nihei et al. |
| 5,637,050 A | 6/1997 | Chludek |
| 5,696,680 A | 12/1997 | Ichioka et al. |

(Continued)

FOREIGN PATENT DOCUMENTS

| | | |
|---|---|---|
| DE | 811650 C | 8/1951 |
| DE | 102004015278 A1 | 10/2005 |

(Continued)

*Primary Examiner* — David J Hlavka
(74) *Attorney, Agent, or Firm* — Harness, Dickey & Pierce, P.L.C.

(57) ABSTRACT

A drive module that includes a Ravigneaux gearset, a first input shaft, first through fourth gears, and a differential assembly. The Ravigneaux gearset has a carrier, a first sun gear, a second sun gear, and a plurality of first planet gears that are journally supported by the carrier and drivingly coupled to the first and second sun gears. The first input shaft is coupled to the first sun gear for rotation therewith. The first gear is coupled to the first input shaft. The second gear is meshingly engaged to the first gear. The differential assembly has a differential input and first and second differential outputs. The differential input is coupled to the second gear for rotation therewith. The third gear is coupled to the carrier for rotation therewith. The fourth gear is coupled to the first differential output for rotation therewith and is meshingly engaged to the third gear.

10 Claims, 2 Drawing Sheets

(56) References Cited

U.S. PATENT DOCUMENTS

Figure 1:
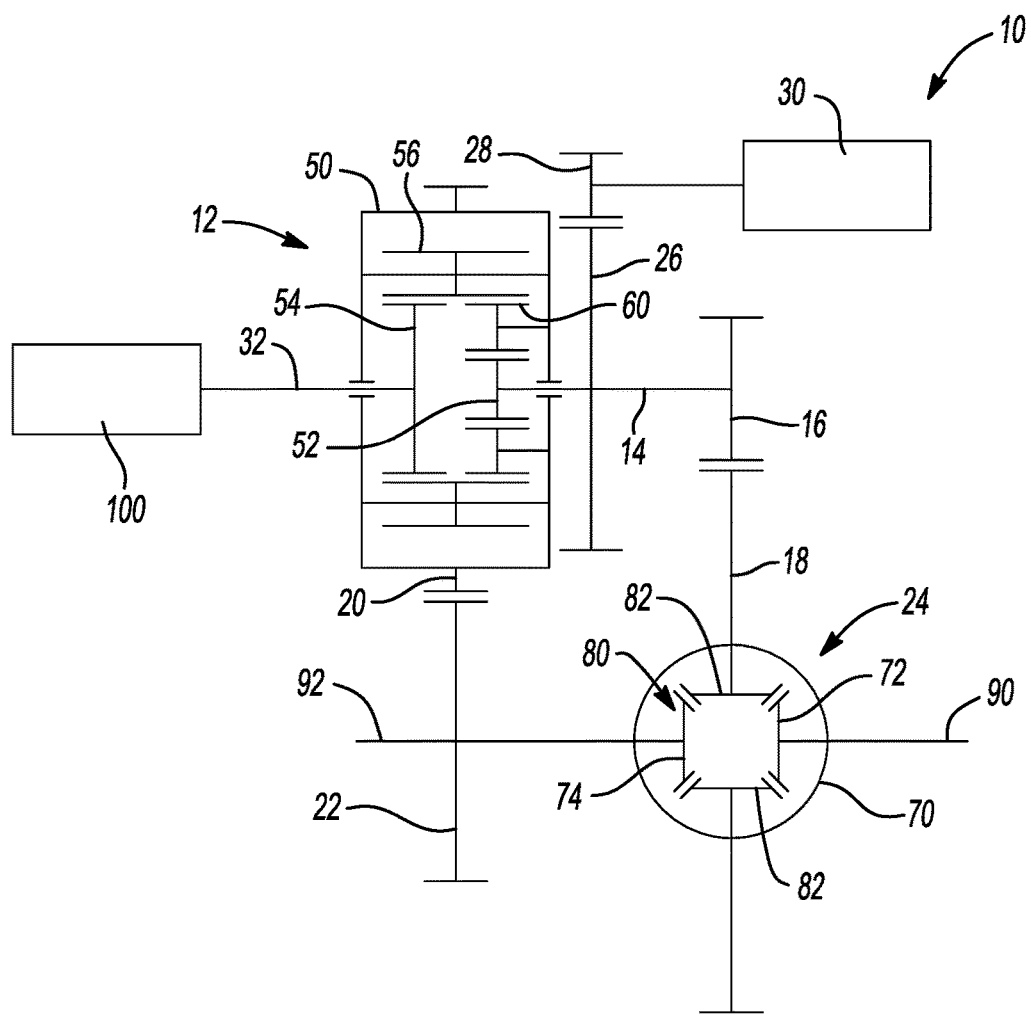

| | | |
|---|---|---|
| 6,027,424 A | 2/2000 | Reynolds |
| 6,098,737 A | 8/2000 | Aoki |
| 6,105,704 A | 8/2000 | Hamada et al. |
| 6,120,407 A | 9/2000 | Mimura |
| 6,123,640 A | 9/2000 | Schulz |
| 6,325,736 B1 | 12/2001 | Hamada et al. |
| 6,484,834 B2 | 11/2002 | Bowen et al. |
| 6,540,636 B2 | 4/2003 | Amanuma et al. |
| 6,595,308 B2 | 7/2003 | Bowen |
| 6,609,993 B2 | 8/2003 | Ohkubo et al. |
| 6,691,013 B1 | 2/2004 | Brown |
| 6,863,636 B2 | 3/2005 | Huber et al. |
| 6,909,959 B2 | 6/2005 | Hallowell |
| 7,081,063 B2 | 7/2006 | Hori et al. |
| 7,104,617 B2 | 9/2006 | Brown |
| 7,216,732 B2 | 5/2007 | Angerer et al. |
| 7,223,198 B2 | 5/2007 | Kimes et al. |
| 7,238,140 B2 | 7/2007 | Gradu |
| 7,270,205 B2 | 9/2007 | Sakai et al. |
| 7,399,247 B2 | 7/2008 | Kempf et al. |
| 7,491,147 B2 | 2/2009 | Ross |
| 7,553,251 B2 | 6/2009 | Nett et al. |
| 7,628,721 B2 | 12/2009 | Yamamura et al. |
| 7,801,657 B2 | 9/2010 | Piyabongkarn et al. |
| 7,867,125 B2 | 1/2011 | Kim et al. |
| 7,873,454 B2 | 1/2011 | Piyabongkarn et al. |
| 7,874,395 B2 | 1/2011 | Taji et al. |
| 8,049,384 B2 | 11/2011 | Wilton et al. |
| 8,057,352 B2 | 11/2011 | Nishiji |
| 8,206,258 B2 | 6/2012 | Ziemer |
| 8,409,425 B2 | 4/2013 | Forrow et al. |
| 8,480,532 B2 | 7/2013 | Biermann et al. |
| 8,545,359 B2 * | 10/2013 | Kato .................. B60K 17/165 475/150 |
| 8,554,441 B1 | 10/2013 | Johansson et al. |
| 8,591,371 B2 | 11/2013 | Dinter et al. |
| 8,663,051 B2 * | 3/2014 | Sten .................. F16H 48/36 475/150 |
| 8,672,790 B2 | 3/2014 | Severinsson et al. |
| 8,788,144 B2 | 7/2014 | Krueger et al. |
| 8,795,121 B2 | 8/2014 | Klomp |
| 8,862,356 B2 | 10/2014 | Miller |
| 8,893,572 B2 | 11/2014 | Wu et al. |
| 8,998,765 B2 | 4/2015 | Sten |
| 9,719,585 B2 * | 8/2017 | Sten .................. F16H 37/082 |
| 2001/0031682 A1 | 10/2001 | Auer et al. |
| 2002/0061801 A1 | 5/2002 | Amanuma et al. |
| 2002/0077217 A1 | 6/2002 | Presley |
| 2003/0203782 A1 | 10/2003 | Casey et al. |
| 2004/0046448 A1 | 3/2004 | Brown |
| 2004/0048710 A1 | 3/2004 | Tumback |
| 2004/0069542 A1 | 4/2004 | Simmons et al. |
| 2004/0089089 A1 | 5/2004 | Stevens et al. |
| 2004/0248695 A1 | 12/2004 | Wang et al. |
| 2005/0006164 A1 | 1/2005 | Teraoka |
| 2005/0176546 A1 | 8/2005 | Fujita et al. |
| 2006/0025273 A1 | 2/2006 | Gradu |
| 2006/0079370 A1 | 4/2006 | Kushino |
| 2006/0276292 A1 | 12/2006 | Puiu |
| 2007/0060432 A1 | 3/2007 | Van Druten et al. |
| 2007/0087889 A1 | 4/2007 | Rosemeier et al. |
| 2007/0123383 A1 * | 5/2007 | Yokoyama ............ B60K 6/365 475/5 |
| 2007/0135255 A1 | 6/2007 | Kim et al. |
| 2007/0213162 A1 | 9/2007 | Takasaki |
| 2007/0249456 A1 | 10/2007 | Meixner |
| 2007/0256869 A1 | 11/2007 | Kozarekar |
| 2007/0259749 A1 | 11/2007 | Ross |
| 2007/0265130 A1 | 11/2007 | Bowen |
| 2008/0064552 A1 | 3/2008 | Tangl |
| 2008/0113842 A1 | 5/2008 | Kinoshita et al. |
| 2008/0176702 A1 | 7/2008 | Showalter |
| 2008/0182695 A1 | 7/2008 | Showalter |
| 2008/0300080 A1 | 12/2008 | Thompson |
| 2009/0038866 A1 | 2/2009 | Abe et al. |
| 2009/0111641 A1 | 4/2009 | Kim et al. |
| 2009/0112430 A1 | 4/2009 | Showalter |
| 2009/0118051 A1 * | 5/2009 | Bock .................. B60K 17/346 475/205 |
| 2009/0188732 A1 | 7/2009 | Janson |
| 2009/0197727 A1 | 8/2009 | Janson |
| 2009/0215576 A1 | 8/2009 | Nishiji |
| 2009/0221396 A1 | 9/2009 | Berg et al. |
| 2009/0253548 A1 | 10/2009 | Showalter |
| 2009/0280948 A1 | 11/2009 | Fuhrer et al. |
| 2010/0234162 A1 | 9/2010 | Troennberg |
| 2010/0263950 A1 | 10/2010 | Larsson et al. |
| 2011/0125382 A1 | 5/2011 | Bonfigt et al. |
| 2011/0243740 A1 | 10/2011 | Siegfriedsen |
| 2011/0256977 A1 | 10/2011 | Hart et al. |
| 2011/0276245 A1 | 11/2011 | Krueger et al. |
| 2012/0083384 A1 | 4/2012 | Ziemer et al. |
| 2012/0088628 A1 | 4/2012 | Ziemer et al. |
| 2012/0133202 A1 | 5/2012 | Mui et al. |
| 2013/0145875 A1 | 6/2013 | Wu et al. |
| 2013/0150205 A1 | 6/2013 | Wu et al. |
| 2013/0199323 A1 | 8/2013 | Fong et al. |
| 2013/0203543 A1 | 8/2013 | Sten |
| 2014/0257664 A1 | 9/2014 | Arbitmann et al. |
| 2014/0358397 A1 | 12/2014 | Gao et al. |
| 2014/0364264 A1 | 12/2014 | Sten |
| 2016/0138659 A1 | 5/2016 | Strandberg |

FOREIGN PATENT DOCUMENTS

| | | |
|---|---|---|
| GB | 2466968 | 7/2010 |
| WO | WO-2011076542 A1 | 6/2011 |

\* cited by examiner understand# ELECTRIC DRIVE MODULE WITH RAVIGNEAUX GEARSET

FIELD

The present disclosure relates to an electric drive module with a Ravigneaux gearset.

BACKGROUND

U.S. Pat. No. 8,663,051 discloses an electric drive module having a transmission with a two-stage planetary transmission having a pair of sun gears that are coupled to one another for common rotation and a pair of internal gears. A first one of the internal gears is fixedly coupled to a housing of the drive module, while the other one of the internal gears is rotatable relative to the housing of the drive module. The internal gears are rather large and as such, are relatively costly to manufacture.

SUMMARY

This section provides a general summary of the disclosure, and is not a comprehensive disclosure of its full scope or all of its features.

In one form, the present disclosure provides a drive module that includes a Ravigneaux gearset, a first input shaft, first through fourth gears, and a differential assembly. The Ravigneaux gearset has a carrier, a first sun gear, a second sun gear, a plurality of first planet gears and a plurality of second planet gears. The first and second planet gears are journally supported by the carrier. The second planet gears are meshingly engaged to the second sun gear. The first planet gears are meshingly engaged to the first planet gears and the first sun gear. The first input shaft is coupled to the first sun gear for rotation therewith. The first gear is coupled to the first input shaft. The second gear is meshingly engaged to the first gear. The differential assembly has a differential input and first and second differential outputs. The differential input is coupled to the second gear for rotation therewith. The third gear is coupled to the carrier for rotation therewith. The fourth gear is coupled to the first differential output for rotation therewith and is meshingly engaged to the third gear.

In another form, the present disclosure provides a drive module that includes a Ravigneaux gearset, a first input shaft, first through fifth gears, a differential assembly and a coupling. The Ravigneaux gearset has a carrier, a first sun gear, a second sun gear, a plurality of first planet gears and a plurality of second planet gears. The first and second planet gears are journally supported by the carrier. The second planet gears are meshingly engaged to the second sun gear. The first planet gears are meshingly engaged to the first planet gears and the first sun gear. The first input shaft is coupled to the second sun gear for rotation therewith. The first gear is coupled to the first input shaft. The second gear is meshingly engaged to the first gear. The differential assembly has a differential input and first and second differential outputs. The differential input is coupled to the second gear for rotation therewith. The third gear is coupled to the carrier for rotation therewith. The fourth gear is coupled to the first differential output for rotation therewith and is meshingly engaged to the third gear. The fifth gear is rotatably received on the first input shaft. The coupling is operable in a first mode, in which the fifth gear is rotatably coupled to the first input shaft, and a second mode in which the fifth gear is rotatably coupled to the first sun gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
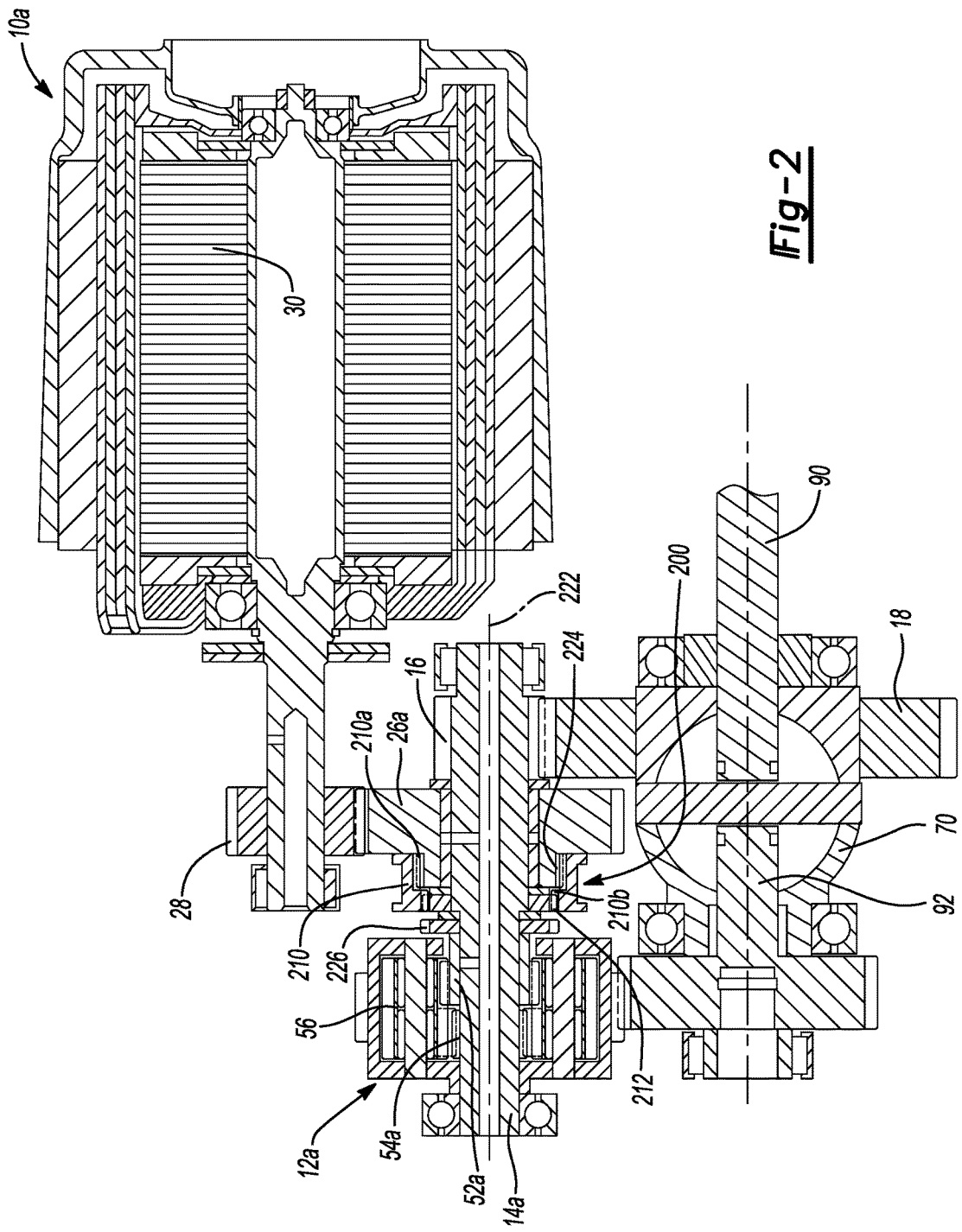

FIG. 1 is a schematic illustration of a first drive module constructed in accordance with the teachings of the present disclosure; and FIG. 2 is a cross-sectional view of a second drive module constructed in accordance with the teachings of the present disclosure.

Corresponding reference numerals indicate corresponding parts throughout the several views of the drawings.

DETAILED DESCRIPTION

With reference to FIG. 1, an exemplary drive module constructed in accordance with the teachings of the present disclosure is generally indicated by reference numeral 10. The drive module 10 can include a Ravigneaux gearset 12, a first input shaft 14, a first gear 16, a second gear 18, a third gear 20, a fourth gear 22, a differential assembly 24, a fifth gear 26, an input gear 28, an electric motor 30 and a second input shaft 32.

The Ravigneaux gearset 12 can have a carrier 50, a first sun gear 52, a second sun gear 54, and a plurality of first planet gears 56 that are journally supported by the carrier 50 and drivingly coupled to the first and second sun gears 52 and 54. The first planet gears 56 are meshingly engaged to the second sun gear 54 and to a plurality of second planet gears 60 that are journally supported by the carrier 50 and meshingly engaged with the first sun gear 52.

The first input shaft 14 is coupled to the first sun gear 52 for rotation therewith. While not shown, it will be appreciated that the first input shaft 14 can be received in a housing (not shown) and supported for rotation relative to the housing via appropriate bearings (not shown).

The first gear 16 is coupled to the first input shaft 14 for rotation therewith. The first gear 16 can be coupled to an end of the first input shaft 14 that is opposite the first sun gear 52.

The second gear 18 is meshingly engaged to the first gear 16 and is rotatable about an axis that is offset from the rotational axis of the first input shaft 14.

The differential assembly 24 can generally have a differential input 70 and first and second differential outputs 72 and 74, respectively. The differential input 70 can be coupled to the second gear 18 for rotation therewith. In the example provided, the differential assembly 24 comprises a differential case, which is the differential input 70 in this example, and a differential gearset 80 that is received in the differential case. The differential gearset 80 can include a plurality of differential pinions 82 that are meshingly engaged to first and second side gears. The first side gear can be coupled to (e.g., integrally and unitarily formed with) the first differential output 72 for rotation therewith, while the second side gear can be coupled to (e.g., unitarily and integrally formed with) the second side gear 74 for rotation therewith. The first differential output 72 can be coupled to a first stub shaft 90 for rotation therewith, while the second differential output 74 can be coupled to a second stub shaft 92 for rotation therewith.

The third gear 20 can be coupled to the carrier for rotation therewith.

The fourth gear 22 can be coupled to the first differential output 72 for rotation therewith and can be meshingly engaged to the third gear 20. In the example provided, the fourth gear 22 is coupled to the second stub shaft 92 for rotation therewith.

The fifth gear 26 is coupled to the first input shaft 14 for common rotation. In the particular example provided, the fifth gear 26 is disposed laterally between the carrier 50 and the first gear 16.

The input gear 28 meshingly engaged to the fifth gear 26 and is drivingly coupled to a source of rotary power, such as the electric motor 30. In the example provided, the input gear 28 and the fifth gear 26 are helical gears so that the input gear 28 is rotatable about an input axis that is parallel to the axis about which the first input shaft 14 rotates. It will be appreciated, however, that other types of gears can be employed for the input gear 28 and the fifth gear 26, such as a worm and worm gear, respectively, or bevel gears, to permit the input axis to be positioned in an orientation that is different from that which is illustrated here. It will also be appreciated that the source of rotary power could be an internal combustion engine (not shown) instead of the electric motor 30, which can provide rotary power to the input gear 28 via a transmission (not shown), a power take-off unit (not shown) and a propshaft (not shown).

The second input shaft 32 is coupled to the second sun gear 54 for rotation therewith. The second input shaft 32 can be coupled for rotation with another source of rotary power, such as a second electric motor 30.

In operation, propulsive power can be provided by the electric motor 30 to drive the first input shaft 14 (via the input gear 28 and the fifth gear 26). Rotation of the first input shaft 14 causes corresponding rotation of the first gear 16, which drives the second gear 18 and the differential input 70, since the differential input 70 is coupled to the second gear 18 for common rotation. In this mode of operation, the Ravigneaux gearset 12, and the third and fourth gears 20 and 22 do not affect the rotary power that is applied to the first and second stub shafts 90 and 92 by the differential assembly 24.

In situations where it would be advantageous to apply equal but opposite moments to the first and second stub shafts 90 and 92, a second electric motor 100 can be operated to drive the second sun gear 54 in a desired direction. In this mode of operation, the Ravigneaux gearset 12 functions to apply equal but opposite moments to the first and second stub shafts 90 and 92.

With reference to FIG. 2, a second drive module constructed in accordance with the teachings of the present disclosure is generally indicated by reference numeral 10a. The drive module 10a can be generally similar to the drive module 10 of FIG. 1 except that: a) the fifth gear 26a is rotatably disposed on the first input shaft 14a, b) the first sun gear 52a of the Ravigneaux gearset 12a is rotatably disposed on the first input shaft 14a and meshes directly with the first planet gears 56, c) the second sun gear 54a of the Ravigneaux gearset 12a is coupled to the first input shaft 14a for rotation therewith, d) only one source of rotary power is required (i.e., the first electric motor 30 and the second input shaft 32 of FIG. 1 are omitted) and e) a coupling 200 is employed to selectively couple the fifth gear 26a to either the first input shaft 14a or the first sun gear 52a.

In the example provided, the coupling 200 comprises an internally toothed sleeve 210 that engages corresponding external teeth 224 formed on the fifth gear 26a. The sleeve 210 is movable along the rotational axis 222 of the first input shaft 14a between a first position, in which the internal teeth of the sleeve 210 also matingly engage external teeth 212 formed on or otherwise coupled to the first input shaft 14a but do not engage external teeth 226 that are formed on or otherwise engaged to the first sun gear 52a, and a second position in which the internal teeth of the sleeve 210 mating engage external teeth 226 formed on or otherwise coupled to the first sun gear 52a but do not engage external teeth 212 formed on or otherwise coupled to the first input shaft 14a. In the example provided, the internal teeth of the sleeve 210 comprise a set of large internal teeth 210a, which are engagable to the external teeth 224 on the fifth gear 26a, and a set of small internal teeth 210b that are alternately engagable to the external teeth 212 on the first input shaft 14a or to the external teeth 226 formed on the first sun gear 52a.

During operation of the drive module 10a when propulsive power for driving the first and second stub shafts 90 and 92 is desired, the sleeve 210 of the coupling 200 can be moved into its first position to non-rotatably couple the fifth gear 26a to the first input shaft 14a (and thereby decouple the first sun gear 52a from the fifth gear 26a to permit relative rotation between the first sun gear 52a and the first input shaft 14a). In this mode, rotary power from the electric motor 30 drives the first input shaft 14a (via the input gear 28 and the fifth gear 26a). Rotation of the first input shaft 14a causes rotation of the first gear 16, which drives the second gear 18 to thereby correspondingly rotate the differential input 70.

In situations where it would be advantageous to apply equal but opposite moments to the first and second stub shafts 90 and 92, the sleeve 210 of the coupling 200 can be moved into its second position to non-rotatably couple the fifth gear 26a to the first sun gear 52a (and thereby decouple the fifth gear 26a from the first input shaft 14a to permit relative rotation between the fifth gear 26a and the first input shaft 14a). In this mode of operation, rotary power from the electric motor 30 drives the Ravigneaux gearset 12a so that the Ravigneaux gearset 12 applies equal but opposite moments to the first and second stub shafts 90 and 92.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
a Ravigneaux gearset having a carrier, a first sun gear, a second sun gear, a plurality of first planet gears and a plurality of second planet gears, the first and second planet gears being journally supported by the carrier, the first planet gears being meshingly engaged to the second sun gear and the second planet gears, the second planet gears being meshingly engaged to the first sun gear;
a first input shaft coupled to the first sun gear for rotation therewith;

a first gear coupled to the first input shaft;
a second gear meshingly engaged to the first gear;
a differential assembly having a differential input and first and second differential outputs, the differential input being coupled to the second gear for rotation therewith;
a third gear coupled to the carrier for rotation therewith; and
a fourth gear coupled to the first differential output for rotation therewith, the fourth gear being meshingly engaged to the third gear.

2. The drive module of claim 1, further comprising:
a fifth gear coupled to the first input shaft for common rotation;
an input gear meshingly engaged to the fifth gear; and
a first electric motor drivingly coupled to the input gear.

3. The drive module of claim 2, wherein the input gear is rotatable about an input axis that is parallel to an axis about which the first input shaft rotates.

4. The drive module of claim 2, further comprising a second motor drivingly coupled to the second sun gear.

5. The drive module of claim 1, further comprising a second shaft that is coupled to the second sun gear for rotation therewith.

6. The drive module of claim 1, wherein the differential assembly comprises a differential case and a differential gearset received in the differential case, the differential gearset comprising a plurality of differential pinons that are meshingly engaged to a first side gear and a second side gear, the first side gear being coupled to the first differential output for rotation therewith, the second side gear being coupled for rotation with the second side gear.

7. A drive module comprising:
a Ravigneaux gearset having a carrier, a first sun gear, a second sun gear, a plurality of first planet gears and a plurality of second planet gears, the first and second planet gears being journally supported by the carrier, the first planet gears being meshingly engaged to the second sun gear and the second planet gears, the second planet gears being meshingly engaged to the first sun gear;
a first input shaft coupled to the second sun gear for rotation therewith;
a first gear coupled to the first input shaft;
a second gear meshingly engaged to the first gear;
a differential assembly having a differential input and first and second differential outputs, the differential input being coupled to the second gear for rotation therewith;
a third gear coupled to the carrier for rotation therewith; and
a fourth gear coupled to the first differential output for rotation therewith, the fourth gear being meshingly engaged to the third gear;
a fifth gear rotatably received on the first input shaft; and
a coupling that is operable in a first mode, in which the fifth gear is rotatably coupled to the first input shaft, and a second mode in which the fifth gear is rotatably coupled to the first sun gear.

8. The drive module of claim 7, further comprising an input gear meshingly engaged to the fifth gear, and an electric motor drivingly coupled to the input gear.

9. The drive module of claim 8, wherein the input gear is rotatable about an input axis that is parallel to an axis about which the first input shaft rotates.

10. The drive module of claim 7, wherein the differential assembly comprises a differential case and a differential gearset received in the differential case, the differential gearset comprising a plurality of differential pinons that are meshingly engaged to first and second side gears, the first side gear being coupled to the first differential output for rotation therewith, the second side gear being coupled for rotation with the second side gear.

* * * * *